United States Patent [19]

Marek et al.

[11] 3,922,334

[45] Nov. 25, 1975

[54] FOAM CARBONIZATION AND RESULTING FOAM STRUCTURES

[75] Inventors: Ronald W. Marek, Tonawanda; William T. Yudichak, Niagara Falls, both of N.Y.

[73] Assignee: Airco, Inc., Montvale, N.J.

[22] Filed: Jan. 31, 1973

[21] Appl. No.: 328,230

[52] U.S. Cl. .................. 423/445; 264/29; 423/449; 427/228; 427/244
[51] Int. Cl.² .................... B05G 3/02; C01B 31/02
[58] Field of Search .... 117/46 CB, 46 CC, DIG. 11; 423/445, 449; 264/29

[56] References Cited
UNITED STATES PATENTS

| | | | |
|---|---|---|---|
| 3,126,296 | 3/1964 | Moutaud | 117/46 CC |
| 3,304,148 | 2/1967 | Gallagher | 117/46 CC |
| 3,479,151 | 11/1969 | Gutzeit | 117/46 CB |
| 3,573,086 | 3/1971 | Lambdin | 117/46 CB |
| 3,666,526 | 5/1972 | Ettinger et al. | 117/46 CB |
| 3,676,173 | 7/1972 | Adams | 117/46 CB |
| 3,775,170 | 11/1973 | Rosenblatt | 117/46 CB |
| 3,788,938 | 1/1974 | Adams | 117/46 CB |
| 3,810,780 | 5/1974 | Ardary et al. | 117/46 CB |
| 3,825,460 | 7/1974 | Yoshikawa et al. | 117/46 CC |

*Primary Examiner*—William D. Martin
*Assistant Examiner*—Janyce A. Bell
*Attorney, Agent, or Firm*—Edmund W. Bopp; H. Hume Mathews

[57] ABSTRACT

A fully reticulated polyurethane foam is treated with a solution of a phenolic resin and coal-tar pitch in a tetrahydrofuran solvent. The resin and pitch are absorbed into the polyurethane strands, thereby becoming an integral part of such strands. The structure is subsequently heat-treated through a rigidizing cure cycle and through a carbonizing cycle, to obtain a fully reticulated, low-density carbon foam. This resulting structure may be activated to high surface area values by selective oxidation of the carbon article; or activation can be effected by carbonizing the cured article in the presence of metal chlorides.

9 Claims, No Drawings

FOAM CARBONIZATION AND RESULTING FOAM STRUCTURES

BACKGROUND OF INVENTION

This invention relates generally to refractory foams, and more specifically relates to fully reticulated carbon foams having very high strength-to-weight ratios.

Within recent years, much interest has been evidenced in refractory foamed materials, such as carbon foams. These foamed materials possess high strength-to-weight ratio, are good heat insulators, and are thermally very stable, properties rendering thee materials very useful for applications in demanding aerospace and related environments. The foams treated in the present invention are a special case of the more general refractory foams referred to, and are characterized by an open, interconnected, and uniform cellular structure. This type of foam structure, which thus provides interconnected porosity, will henceforth be referred to as a "fully reticulated" foam. Carbon foams of this latter type particularly when activated, have vast potential application in the treatment of gases or so forth, as for example, in filtering systems for adsorbing undesired gaseous components in gas treatment operations.

It is, of course, now well known to produce a low density carbon product by carbonizing a foamed resin by heating to a temperature above the decomposition temperature for that particular organic polymer leaving the non-volatile carbon skeleton. While this is a satisfactory way to produce a low density refractory material, such material is not reticulated, i.e., the pores of the material are not interconnected so as to permit the free flow of fluids through the material.

Polyurethane foam such as that made by the Scott Paper Company, on the other hand, is fully reticulated but cannot be transformed into a corresponding carbon product because before decomposition takes place the resinous material sublimes or melts and evaporates. The prior art has undertaken to overcome this problem by several different techniques. In one such prior technique, for example, a reticulated polyurethane or similar foam, is subjected to dusting with a carbonizable solid, which is subsequently heated to fusing temperature. Upon continued heating, the substructure of polyurethane melts and is evaporated, effectively leaving an exoskeleton of the covering material — which may then be carbonized by further heating. This technique tends to produce a relatively poor and structurally weak product since the dusted solid tends to deposit principally on accessible surface areas of the pores defining the treated organic foam. In a related prior art technique, a polyurethane, or similar reticulated foam, is coated with a resin material dissolved in acetone or similar solvent. Again, the structure is subjected to a heating schedule designed to decompose the underlying framework of polyurethane, leaving the exoskeleton of resinous covering material, which upon continued heating is carbonized. Related techniques and products are also set forth in U.S. Pat. No. 3,666,526, wherein polyurethane, polystyrene or cellulose foams are treated with an organic thermosetting resin, such as a phenolic or epoxy resin, after which the foam is subjected to a heating schedule capable of decomposing the organic foam carrier and carbonizing the resin.

In all of the prior art techniques referred to above, an essential point to be borne in mind is that it is basically a surface coating which is provided for the organic foam structure. In consequence, upon decomposition of the organic foam during the heat treatment process, that which is ultimately left is present as essentially a carbonized exoskeleton. This is to say, that the webs forming the boundaries of individual pores are hollow structures defined in cross-section by a pair of spaced layers: the "space" between layers being that previously occupied by the decomposed organic foam. In consequence of this factor, the resultant carbon foams, while perhaps being fully reticulated, are lacking in mechanical strength. It is also noteworthy that where resin in a solvent system has been used to impregnate the foam, such as the phenolic resinacetone combination mentioned above, the heat processing of the thus impregnated foam causes, for reasons that are not fully understood, an undesirably large amount of shrinkage in the structure, in consequence of which further weakening of the integrity of the product ensues.

In accordance with the foregoing, it may be regarded as an object of the present invention, to provide a process enabling preparation of a fully reticulated carbonized foam of superior mechanical properties and of structure facilitating activation thereof.

It is a further object of the invention, to provide a process enabling preparation of carbonized fully reticulated foams from reticulated polyurethane or similarly structured foams, which process results in minimal shrinkage during the heat treatment portion thereof.

It is a yet further object of the present invention, to provide fully reticulated carbonized foams displaying high strength characteristics.

It is another object of the present invention, to provide fully reticulated carbonized foams which are evenly activated throughout their structure, and which present low resistance to flow of a fluid stream, the combination of said features enabling adsorption of species from the fluid stream with a minimum of pressure drop.

SUMMARY OF INVENTION

Now in accordance with the present invention, the foregoing objects, and others as will become apparent in the course of the ensuing specification, are achieved through use of a process wherein a reticulated polyurethane foam is initially treated with a solution of a phenolic resin in a tetrahydrofuran solvent. In the preferred foam of the invention coal-tar pitch is also included in the solution. This treatment may be accomplished, for example, by soaking the foam in a suitably comprised treating solution. The resin and pitch are absorbed into the polyurethane strands, thereby becoming an integral part of such strands — and not simply a coating. After removing the soaked foam, it is drained, may be pressed to remove excess solution, and can be further air-dried. It is thereafter cured by a suitable heating schedule extending up to about 200°C. Subsequently, the body is subjected to a carbonizing cycle, which includes baking up to about 900°C to yield the fully reticulated, low-density carbon foam. The foam is thus reproduced in "fossil" form as opposed to the prior art which reproduced it in "exoskeletal" form. The resultant structure may then be activated to high-surface area values by selective oxidation thereof; alternatively, carbonizing of the cured article may be effected in the presence of metal chlorides, or other oxidizing agents.

The product resulting from practice of the foregoing process, is found under testing to display high compressive strengths, low-density, and very high surface area. The webs forming the boundaries of individual pores are substantially solid, due to absorption of the treating solution into the polyurethane strands. The resistance to fluid flow offered by the foam is of low value, and the absorption properties of the foam, when activated, are excellent. In this connection, it should be emphasized that the outstanding properties of the present foams indeed arise from the fact that fully reticulated structures of superior strength and interconnected porosity are achieved. Also it should be noted that this method of reproducing the foam structure by displacement is possible only with fully reticulated structrues in which the solution carrying the replacement materials can fully penetrate the structure and act on the pore separating webs. It will be appreciated that furans chemically related to one of the components of the treating solution used in the invention, have been described in the past (U.S. Pat. No. 3,345,440), for use in manufacturing foamed carbon products. In the prior art technique described in the cited patent, however, a partially polymerized furfuryl alcohol is incorporated with the urethane-forming compounds prior to the foaming process. In consequence of this procedure, the organic foam thereby formed (which is subsequently carbonized), is not of the fully reticulated type treated by the present invention, and accordingly, while useful for many purposes, is not possessive of the properties achieved in accordance with the invention.

DESCRIPTION OF PREFERRED EMBODIMENT

In accordance with the present invention, a fully reticulated organic foam is initially impregnated with the treating solution of the invention. While the invention is believed to be applicable to other materials, the preferred material is a polyurethane foam of the reticulated network type. Such polyurethane foams are available, for example, from the Scott Paper Company, and may be thus secured exhibiting 10, 25, 45, 60, or 80 pores per inch. In a typical procedure, a foam sample of this type is soaked in a treating solution comprising tetrahydrofuran, coal-tar pitch and a phenolic resin. The sample may be soaked for up to 4 hours or longer, but preferably is soaked for a minimum period of 15 to 30 minutes. The weight ratio between the coal-tar pitch and phenolic resin, and the tetrahydrofuran solvent, is preferably about 2:8, although increased ratios of the two solute components to solvent may be utilized up to a solute-to-solvent ratio as high as about 8:2. Where the ratio between resin and coal tar pitch, and the tetrahydrofuran solvent, is in the indicated range of from about 2:8 to about 8:2, the phenolic resin may be present from about 7 to 29 p.p.h. by weight, and the coal-tar pitch as about 4 to 29 p.p.h. by weight, with the balance of the solution being tetrahydrofuran. A most satisfactory solution for present purposes may be formulated from about 1,770 parts by weight tetrahydrofuran, 200 parts by weight of coal-tar pitch, and 800 parts by weight of phenolic resin. More generally the tetrahydrofuran utilized in the treating solution may be present in the range of from about 47 to 78 p.p.h. by weight of the solution, the coal-tar pitch in the range of from about 0 to 29 p.p.h. by weight, and the phenolic resin in the range of from about 7 to 53 p.p.h. by weight of the solution. The tetrahydrofuran referred to is available from the Riverside Chemical Company.

The coal-tar pitch suitably may comprise that designated as a 150°C coal-tar pitch by Allied Chemical Corporation, from which it is obtained. Other coal-tar pitches may be utilized in the treating solution, such as those designated as Allied No. 30, Allied 175°C, Koppers No. 30, or U.S. Steel No. 30. The coal-tar pitch compositions utilized in the present formulations are significant in several respects, one being that the said pitch is considerably cheaper than the resins and helps to decrease the cost of the treating solutions. It also appears, however, that some type of interaction occurs between the components of the solution as the resin polymerizes during the heating schedule. In particular, it has been found that considerably less shrinkage in sample volume occurs during processing if coal-tar pitch is present in the formulation, than occurs in its absence — with a consequent improvement in the mechanical properties of the resultant foam.

The phenolic resin utilized may comprise a thermo-setting resin, such as that available from the Carborundum Company, Polymer Systems Dept., Niagara Falls, N.Y. under the designation Carborundum PED-1000. Other common thermo-setting phenolic resins, such as these available from Hooker Chemical Corporation under the product designation Durez 7347A may similarly be employed.

After the soaked foam is removed from the treating solution, it is drained and pressed, as on absorbent paper, to remove excess solution and to rupture any solution membranes that may have formed in the pores during the soak. The soaked foam at this point typically displays a weight gain of the order of 200 percent for a 10 P.P.I. foam to about 300 percent for an 80 P.P.I. foam. Further removal of the solvent is often advisable prior to curing, and this may be readily accomplished by allowing the soaked foam to remain exposed to the ambient atmosphere for a prolonged period, as for example, overnight.

Curing of the soaked foam is then effected by heating to about 200°C in air to obtain a cured or rigidized material. A typical cure schedule is set forth in Table I below:

Table I

Cure schedule:
Room temperature- 65°C at 30°C/hour, 6-hour hold
      65° – 93°C at 30°C/hour, 2-hour hold
      93° – 121°C at 30°C/hour, 2-hour hold
      121° – 141°C at 30°C/hour, 2-hour hold
      141° – 165°C at 10°C/hour, 2-hour hold
      165° – 177°C at 10°C/hour, 2-hour hold
      177° – 200°C at 10°C/hour, 2-hour hold The cured foam may be re-soaked in the treating solution and re-cured in order to densify or strengthen the structure. After being re-soaked, excess solution may be removed from the rigidized network via draining and by jetting compressed air through the foam to break solution membranes. Thereafter, the foam may be subjected to the carbonizing or baking operation. To avoid distortion, or excessive shrinkage of the foam during such operation, the foam may be encased in ⅛ to ¼ inch thick graphite plates. The foam is thus placed in a sagger and covered with a coke pack. A typical baking schedule is 100°C/hour to 900°C.

Typical physical property data obtained from foam samples prepared in accordance with the foregoing techniques are presented in Tables II and III herein below. It should be appreciated that the strength and resistivity values in these tables are only indicative of these properties. With foams, only a small portion of the geometrical surface contacts the blocks of the measuring system. Consequently, techniques used to measure strength and resistivity values on less porous block samples will yield values that are less than those techniques that measure strand strength or resistivity. Volume change data are also seen in these tables.

TABLE II and TABLE III

TABLE II
Physical Properties of Carbon Foams - One Treatment

| Polyurethane Foam, Pores Per Inch | Carbon Avg. Density g/cc | Original to Bake Vol. % | Carbon Resistivity ohm-inch | Carbon Compressive Strength (psi) |
| --- | --- | --- | --- | --- |
| 10 | 0.04 | −41.3 | 11.3 | 2.1 |
| 25 | 0.03 | −46.3 | 6.3 | 2.8 |
| 45 | 0.05 | −34.0 | 10.8 | 6.8 |
| 60 | 0.07 | −31.8 | 9.0 | 16.6 |
| 80 | 0.06 | −40.6 | 9.7 | 10.7 |

TABLE III
Physical Properties of Carbon Foam - Dual Soak and Cure Treatment

| Polyurethane Foam, Pores Per Inch | Carbon Avg. Density g/cc | Original to Bake Vol. % Δ | Carbon Resistivity ohm-inch | Carbon Compressive Strength (psi) |
| --- | --- | --- | --- | --- |
| 10 | 0.07 | −23.0 | 26.7 | 6.2 |
| 25 | 0.06 | −26.5 | 12.0 | 6.1 |
| 45 | 0.09 | −15.4 | 16.1 | 17.2 |
| 60 | 0.08 | −27.4 | 4.0 | 27.7 |
| 80 | 0.09 | −22.4 | 4.7 | 31.3 |

As mentioned above, strength can be increased by increasing the amount of carbonizable material in or on the network strands of the foam. This may be accomplished by resoaking cured foams in the treating solution and subjecting them to a second cure cycle before baking. Property data presented in Table III indicate that processing the foams through two soak and cure treatments before carbonizing, increases the strength substantially; but in addition, it will be noted that the volume changes that occur during processing the Table III foams during the bake stage are limited to values less than −30%. Indeed, the 45 P.P.I. material shown in the table, exhibits a shrinkage of only −15.4% and with a group of numerous 45 P.P.I. samples, the average value was −17.1%.

It is known that most carbonaceous materials can be activated, but some materials like blood or bones are easily activated, while cokes from hydrocarbons are more resistant. In accordance with the present invention, it has been found that two fundamental processes may be effectively utilized for producing activation. In particular, activation may occur during carbonization or it can be developed after carbonization. Activation after carbonization depends upon selective oxidation of the carbonaceous matter; activation during carbonization depends upon inorganic chemical compounds that degrade or dehydrate the organic molecules.

The technique found most suitable for activating the foam structure during carbonization utilizes carbonates to release carbon dioxide by decomposition of the said carbonates. If the carbon foam is merely heated to a sufficient temperature in oxygen or carbon dioxide, oxidation will indeed occur. Because of diffusion, however, greater oxidation occurs at the outer regions of the piece than occurs within the piece. Therefore, the preferred technique disperses the carbonate, such as $CaCO_3$ throughout the carbon foam. Typically, the carbon foams are packed in stainless steel saggers, using powdered $CaCO_3$ as pack (about 200 g $CaCO_3$ to every 12 g of carbon). The sagger containing the foam and $CaCO_3$ is vigorously vibrated during the packing operation in order to assure dispersion of $CaCO_3$ throughout the foam. At temperatures in excess of 825°C, the $CaCO_3$ releases carbon dioxide. Consequently, the sagger is placed in a kiln and heated to about 900°C, or it may be placed in a preheated 900°C kiln. After a time appropriate to achieve the desired weight loss (typically 20 to 48 hours for 60% weight loss), the sagger is removed and allowed to cool. After cooling, the foams are washed with water, soaked in dilute HCl, rinsed thoroughly with distilled water, and dried at 120° to 150°C.

Alternatively, as indicated above, activation may be effected by treatment of the foam with such compounds as zinc chloride. For example, a cured foam may be soaked in 10 molar, 4 molar, 2 molar or 1 molar aqueous solutions of zinc chloride. No specific soaking time is required. After draining, the foams may be placed in a 120°C oven for a period of several hours (for example, 7 hours), and are then baked to 900°C at 100°C per hour in a nitrogen atmosphere. During the baking process, the articles may be encased in graphite plates as mentioned previously, placed in a sagger, and covered with a coke pack.

Activated foams, prepared in accordance with the foregoing procedures, possess a fully reticulated structure, exhibit high surface areas, and exhibit excellent adsorption capabilities for such agents as iodine and carbon tetrachloride. They also exhibit a much lesser resistance to fluid flow than comparable volumes of substances such as commercially available particulate activated charcoal. Significant property values of activated foams produced in accordance with the invention are set forth in Table IV. Examination of the data complied in Table IV will clearly indicate that the activation techniques utilized greatly increase the surface area values of the foams. Ability to adsorb iodine was demonstrated by determining the percentage that was adsorbed from 100 cc of 0.21N iodine, in five minutes, by 0.5 gram or 0.1 gram of carbon. Carbon tetrachloride adsorption was determined by passing dry air containing carbon tetrachloride through a sample bed 10 mm in diameter by 15 cm long, and determining sample weight increase after one hour. Dry air was bubbled through a reservoir of carbon tetrachloride (0°C) and passed through the column containing the sample at a rate of 510 cc per minute. For comparison purposes, data for commercial activated charcoals are also presented in Table IV. It will be clear that the reticulated foam structures have been activated to equal or surpass the typical values obtained for particulate-type activated charcoals.

higher for the 25 P.P.I. and 10 P.P.I. foams than for typical samples of activated charcoal.

TABLE V

Pressure Drop Data
Sample Length 15 cm.
Cross-Sectional Area 0.785 cm²
Air Flow 510 cc/min.

| | Pressure Drop mm. of H₂O |
|---|---|
| 1. Fisher 5-690 Activated Charcoal 50-200 mesh | >700 |
| 2. Fisher 5-685 Activated Charcoal 6-14 mesh | 21.5 |
| 3. Activated Carbon Foam (80 ppi) | 12.0 |
| 4. Activated Carbon Foam (45 ppi) | 9.0 |
| 5. Activated Carbon Foam (25 ppi) | 0.5 |
| 6. Activated Carbon Foam (10 ppi) | 0 – 0.1 |

Table IV

Property Values - Activated Foams

| Pore Size | Activation Process[1] | Avg. Density gms/cc | Resistivity ohm-inch | Comp. Strength (psi) | Surface Area m²/g | %Iodine by Grams 0.5 | Adsorbed of Carbon 0.1 | %CCl₄ Activity |
|---|---|---|---|---|---|---|---|---|
| 80 | None | 0.06 | 9.3 | 12.9 | 3 | 3.5 | — | |
| 80(S)[2] | None | 0.09 | 4.7 | 31.3 | — | — | — | |
| 60 | None | 0.07 | 9.0 | 16.6 | — | — | — | |
| 60(S) | None | 0.08 | 4.0 | 27.7 | — | — | — | |
| 45 | None | 0.05 | 10.8 | 6.8 | — | — | — | |
| 45(S) | None | 0.09 | 16.1 | 17.2 | — | — | — | |
| 25 | None | 0.04 | 6.3 | 2.8 | — | — | — | |
| 25(S) | None | 0.06 | 12.0 | 6.1 | — | — | — | |
| 10 | None | 0.04 | 11.3 | 2.1 | — | — | — | |
| 10(S) | None | 0.07 | 26.7 | 6.2 | — | — | — | |
| 80 | CaCO₃ −12.1% wt. loss | 0.05 | 16.3 | 12.3 | 496 | 40.0 | 11.2 | |
| 10 | CaCO₃ −37.4% wt. loss | 0.03 | | | | 94.6 | 29.5 | 34.7 |
| 25 | CaCO₃ −39.6% wt. loss | 0.03 | | | | 96.9 | 34.8 | 35.1 |
| 25 | CaCO₃ −46.4% wt. loss | 0.03 | | | | 97.0 | 37.1 | 37.4 |
| 80 | CaCO₃ −46.9% wt. loss | 0.03 | 50.0 | 8.2 | 833 | 98.2 | 38.0 | |
| 60 | CaCO₃ −60.8% wt. loss | 0.03 | 170.5 | 4.4 | 1322 | 97.7 | 48.6 | 71.0 |
| 80(S) | CaCO₃ −39.7% wt. loss | 0.05 | 33.5 | 19.0 | 1063 | 98.9 | 47.0 | |
| 60(S) | CaCO₃ −35.3% wt. loss | 0.06 | 23.3 | 11.6 | 1063 | >98.0 | 48.4 | |
| 80 | ZnCl₂ (10 M solution) | 0.03 | 1779 | 4.2 | 936 | | | |
| 60 | ZnCl₂ (10 M solution) | 0.03 | 1802 | 2.4 | 1156 | | | |
| 45 | ZnCl₂ (10 M solution) | 0.03 | 998 | 2.3 | 963 | 96.0 | 60.7 at 0.2 grams | 22.3 |
| 25 | ZnCl₂ (10 M solution) | 0.03 | 296 | 2.0 | 673 | | | |
| 10 | ZnCl₂ (10 M solution) | 0.03 | 219 | 1.0 | 581 | | | |
| 60 | ZnCl₂ ( 4 M solution) | 0.03 | 406 | 4.5 | 1416 | 95.4 | 37.1 | |
| 60 | ZnCl₂ ( 2 M solution) | | | | 803 | 44.0 | 16.5 | |
| 80(S) | ZnCl₂ (10 M solution) | 0.10 | 19.2 | 12.5 | 960 | 88.4 | 25.5 | |
| 60(S) | ZnCl₂ (10 M solution) | 0.09 | 11.2 | 6.8 | 828 | 87.5 | 25.6 | |
| Fisher 5-685 Activated Cocoanut Charcoal (6-14 mesh) | | — | — | — | 935 | 98.8 | 44.8 | 44.9 |
| Deodorizing - Fisher Fisher 5-690 Cocoanut Charcoal Activated for Decolorizing (50-200 mesh) Fisher Scientific Co. | | — | — | | 1303 | 98.2 | 45.9 | |

[1] The ZnCl₂ treatment is applied prior to bake; the CaCO₃ process occurs during a rebake step.
[2] (S) Process - two soak and cure treatments before carbonizing.

Applications for activated carbons are based on the capability of such materials to specifically absorb certain substances. These may be odors, noxious gases, or simply "impurities". Therefore, the activated foams of the invention are particularly useful for gas purification, gas separation and solvent recovery applications. In gas purification systems, the resistance to fluid flow of the usual bed of activated charcoal is an important problem. Particularly in applications using lowpressure fans or natural convection flow systems, the use of even thin beds of charcoal can be restrictive. Therefore, activated carbon foams are especially suited to these applications because their open structure offers less resistance to fluid flow, and the pressure drop is consequently less. Pressure drop data is presented in Table V herein below, and demonstrates the superiority of foams prepared in accordance with the invention. It furthermore can be shown from this data that adsorption capacity at equivalent pressure drop values will be While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A method for preparing a fully reticulated carbonized foam wherein the webs defining the walls of individual pores are substantially solid, comprising in sequence the steps of: impregnating a fully reticulated polyurethane foam with a solution comprising a thermosetting phenolic resin in a tetrahydrofuran solvent, said solution being absorbed into and becoming an integral part of the structure of said foam; heat-curing the impregnated foam to rigidize said foam; and baking said cured foam to evaporate the polyurethane and carbonize the residual impregnant.

2. A method according to claim 1, further including in said solution, coal-tar pitch.

3. A method according to claim 2, wherein said resin and coal-tar pitch components are in a weight ratio to said solvent component of between 2:8 and 8:2.

4. A method in accordance with claim 2, wherein said phenolic resin is present in the weight range of from about 7 to 29 p.p.h. by weight, said coal-tar pitch as about 4 to 29 p.p.h. by weight and the balance of said solution is tetrahydrofuran.

5. A method according to claim 2, further including activating said carbon foam structure.

6. A method according to claim 5, wherein said foam is activated by selective oxidation of the carbonaceous material subsequent to said carbonization of said foam.

7. A method according to claim 5, wherein said foam is activated by conducting said carbonization step in the presence of metal chlorides.

8. The carbonized foam product prepared by the process of claim 1.

9. The carbonized foam product prepared by the process of claim 2.

* * * * *